Nov. 21, 1950  K. THORNDYKE  2,530,487
PORTABLE ARC WELDER
Filed May 4, 1948  2 Sheets-Sheet 1
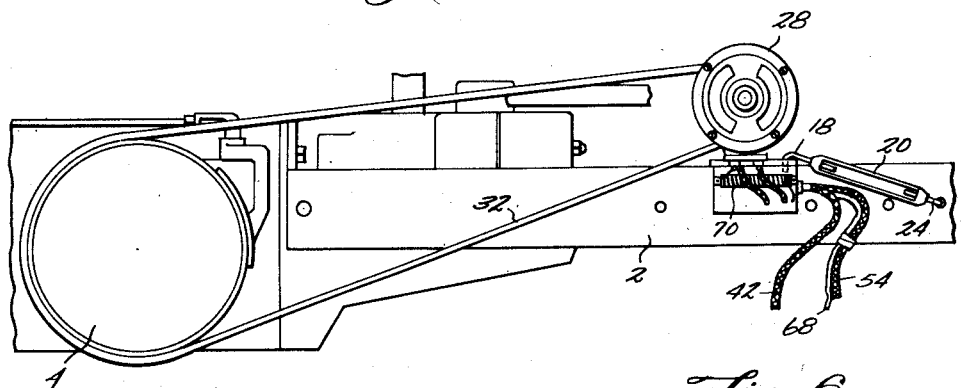
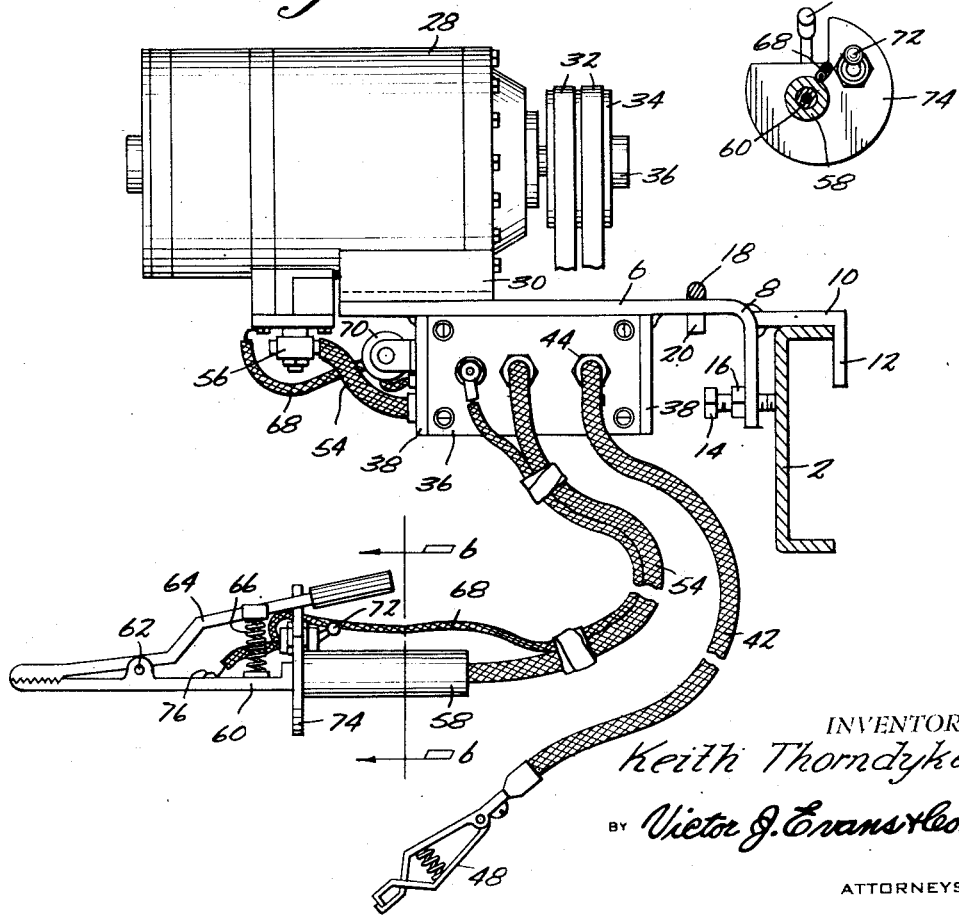
INVENTOR.
Keith Thorndyke,
BY Victor J. Evans & Co.
ATTORNEYS Nov. 21, 1950     K. THORNDYKE     2,530,487
PORTABLE ARC WELDER Filed May 4, 1948     2 Sheets-Sheet 2

INVENTOR.
Keith Thorndyke,
BY Victor J. Evans & Co.
ATTORNEYS

Patented Nov. 21, 1950

2,530,487

UNITED STATES PATENT OFFICE 2,530,487

PORTABLE ARC WELDER

Keith Thorndyke, Pipestone, Minn.

Application May 4, 1948, Serial No. 24,932

2 Claims. (Cl. 322—1)

My present invention relates to an improved portable arc welder of the type adapted to be demountably attached to a power source, as a tractor having a power take-off unit.

According to my invention I employ a generator to be driven by belts or pulleys from the tractor-driven drum, and so mounted on a supporting plate as to be easily and quickly mounted on, or removed from the tractor frame. The device is unitary and may be made ready for use including installation in a matter of a few minutes, and will provide the farmer, and others using such tractors, with welding equipment and at any spot accessible to the tractor.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Figure 1 is an end elevational view showing the generator with the bracket by which it is mounted on the tractor frame.

Figure 2 is a side elevational view showing the generator and mounting bracket.

Figure 6 is a detail taken on line 6—6 of Figure 2.

Figure 3:
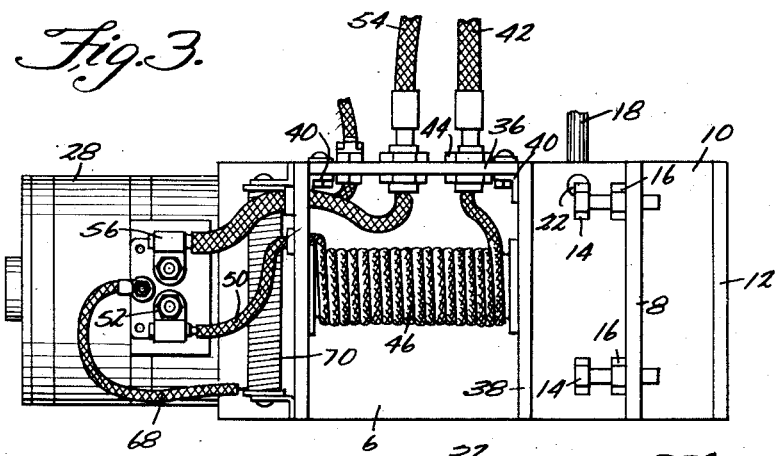
Figure 3 is a view looking upward toward the under surface of the generator and bracket.
Figure 4:
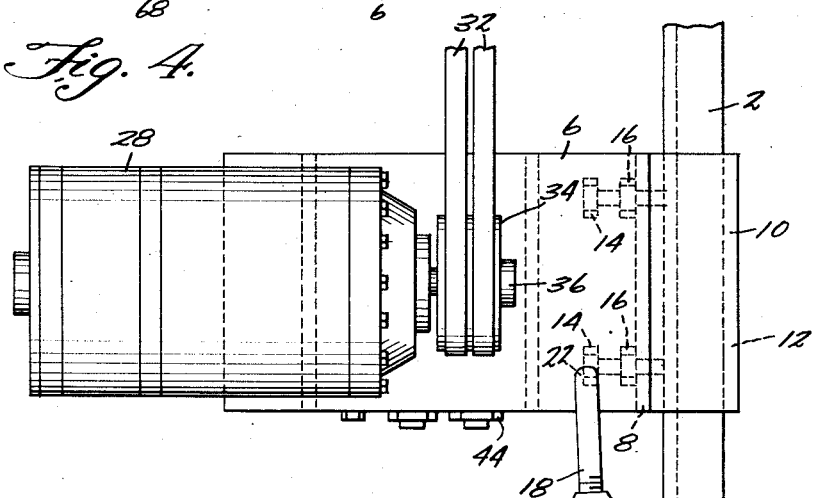
Figure 4 is a plan view of the generator and bracket.
Figure 5:
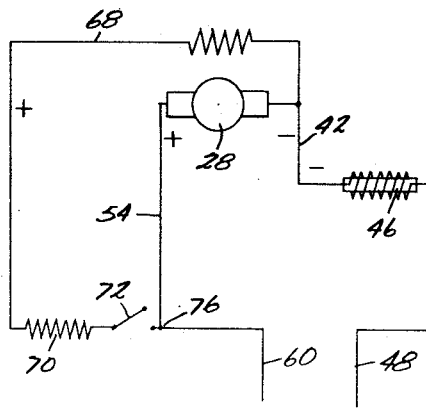
Figure 5 is a view showing the wiring diagram.

Referring now to the drawings wherein like reference characters indicate corresponding parts the portable arc welder is illustrated as attached to a beam 2 of the side frame of a tractor on which is suitably mounted a drive drum or pulley 4 driven by the tractor engine.

The device is supported on a bracket or base plate 6 having a downwardly extending flange 8 with an extension arm 10 providing an outer flange 12. The flange 8 is provided with adjusting screws 12 by which the bracket may be set to struts of different widths and the screws are secured in the set positions by lock nuts 16.

A clamp rod 18 extending from a turnbuckle 20 is bent at 22 to engage the bracket and the other clamp rod 24 is bent at 26 to engage the frame. A generator 28 is mounted in support 30 on the base and belts 32 engage the driven sheave 34 on the shaft 36 to provide power take-off from the drum 4. Obviously with the clamp rods extending from the side of the base opposite to that of the belts, tension may be equalized and the generator will be fixedly secured in its position.

The set screw may be applied and set without tools, and the turnbuckle will quickly and easily effect the proper tension.

On the under side of the base 6 I use the connector panel 36 braced by walls 38 and secured by angles 40. Cable 42 secured by lock nuts 44 in the panel is connected to a reactor 46 and thence to the ground clip 48. From the reactor the wire 50 connects with the ground side of the generator by clip 52.

The positive cable 54 is secured by clip 56 to the generator, extends through the panel and to the handle 58 of fixed arm 60 to which is pivoted at 62 the arm 64 pressed by spring 66.

To control the current flow through the positive cable 54 I provide a parallel field wire 68 to resistor 70, thence to thumb switch 72 on guard 74 on the handle 58 and to the fixed arm 60 at 76.

From the above description it will be apparent that the device of my invention may be quickly and easily mounted for use and it is only necessary to place the base on the tractor frame, secure the belts and adjust the turnbuckle and set screws and the welder is ready for use.

Having thus fully described by invention what I claim as new and desire to secure by Letters Patent is:

1. In a welding outfit for a vehicle having a chassis with side beams, the combination which comprises a longitudinally disposed base plate horizontally positioned and having an inner downwardly extended flange on one end thereof with a second downwardly extended flange extended from the end of the base plate, parallel to the former flange and spaced therefrom, adjusting screws threaded in the said inner flange of the base plate and positioned to coact with the said second flange for clamping the outfit on a side beam of the vehicle chassis, a welding generator mounted on said base plate, a reactor coil carried by the base plate, and a face plate having a plurality of terminals thereon depending from one side of the said base plate.

2. In a welding outfit for a vehicle having a chassis with side beams, the combination which comprises a longitudinally disposed base plate horizontally positioned and having an inner downwardly extended flange on one end thereof with a second downwardly extended flange extended from the end of the base plate parallel to the former flange and spaced therefrom, adjusting screws threaded in the said inner flange of the base plate and positioned to coact with the said second flange for clamping the outfit on a side beam of the vehicle chassis, a welding generator having a field winding mounted on said base plate, a reactor coil carried by the base plate, a face plate having a plurality of terminals thereon depending from one side of the said base plate, a ground cable with a clip on the outer end extended from one of said terminals, an electrode cable with an electrode holder on the outer end extended from another of said terminals, a switch cable extended from a switch on the said electrode holder to another of said terminals of the said face plate, means connecting the terminal of said switch cable to the field winding of the generator on said base plate for disconnecting said field winding from the said electrode holder, and a brace with a turnbuckle therein extended from one side of the said base plate.

KEITH THORNDYKE.

REFERENCES CITED

The following references are of record in the file of this patent:

UNITED STATES PATENTS

| Number | Name | Date |
| --- | --- | --- |
| 1,528,364 | Brown | Mar. 3, 1925 |
| 1,680,843 | Bechaud | Aug. 14, 1928 |
| 1,772,247 | Forrester et al. | Aug. 5, 1930 |
| 1,920,444 | Thoen | Aug. 1, 1933 |
| 2,291,870 | Blair et al. | Aug. 4, 1942 |
| 2,332,126 | Allen | Oct. 16, 1943 |